United States Patent [19]

Takeuchi

[11] Patent Number: 5,555,348
[45] Date of Patent: Sep. 10, 1996

[54] PRINT DEVICE FOR PRINTING CODE DATA IN ASSOCIATION WITH CODE NUMBERS

[75] Inventor: Takami Takeuchi, Nagoya, Japan

[73] Assignee: Brother Kogyo Kabushiki Kaisha, Nagoya, Japan

[21] Appl. No.: 194,312

[22] Filed: Feb. 10, 1994

[30] Foreign Application Priority Data

Mar. 12, 1993 [JP] Japan .................. 5-078761

[51] Int. Cl.$^6$ .............................. G06G 15/00
[52] U.S. Cl. ............................ 395/110; 395/112
[58] Field of Search .................... 395/117, 114, 395/115, 112, 110, 111, 150

[56] References Cited

U.S. PATENT DOCUMENTS

| | | | |
|---|---|---|---|
| 4,990,903 | 2/1991 | Cheng et al. | 340/731 |
| 5,111,384 | 5/1992 | Aslanian et al. | 395/575 |
| 5,237,620 | 8/1993 | Deaton et al. | 382/7 |
| 5,248,727 | 9/1993 | Kurosu et al. | 395/147 |
| 5,280,577 | 1/1994 | Trevett et al. | 395/150 |
| 5,317,428 | 5/1994 | Osawa et al. | 358/539 |

*Primary Examiner*—Raymond J. Bayerl
*Assistant Examiner*—Steven P. Sax
*Attorney, Agent, or Firm*—Oliff & Berridge

[57] ABSTRACT

By selecting a desired code table on an operation panel and depressing a print key, a series of code numbers each of which is divided into a first-digit code and a second-digit code and characters and symbols of the selected code table are printed after being edited so as to be in association with each other.

13 Claims, 5 Drawing Sheets

Fig.2

| CODE NUMBER (HEX) | CODE DATA |
|---|---|
| 0 0 | |
| 0 1 | |
| 0 2 | |
| 20 | |
| 21 | ! |
| 22 | " |
| 23 | # |
| 3 0 | 0 |
| 3 1 | 1 |
| 3 2 | 2 |
| 3 3 | 3 |
| 3 4 | 4 |
| 4 A | J |
| 4 B | K |
| 4 C | L |
| 4 D | M |
| F E | ± |
| F F | |
| 0 0 | – |
| 0 1 | – |
| 0 2 | – |

- TB
- Aa, A
- CONTROL CODE
- ROMAN 8
- CHARACTER·SYMBOL CODE
- Ba
- IBM 850

Fig.4

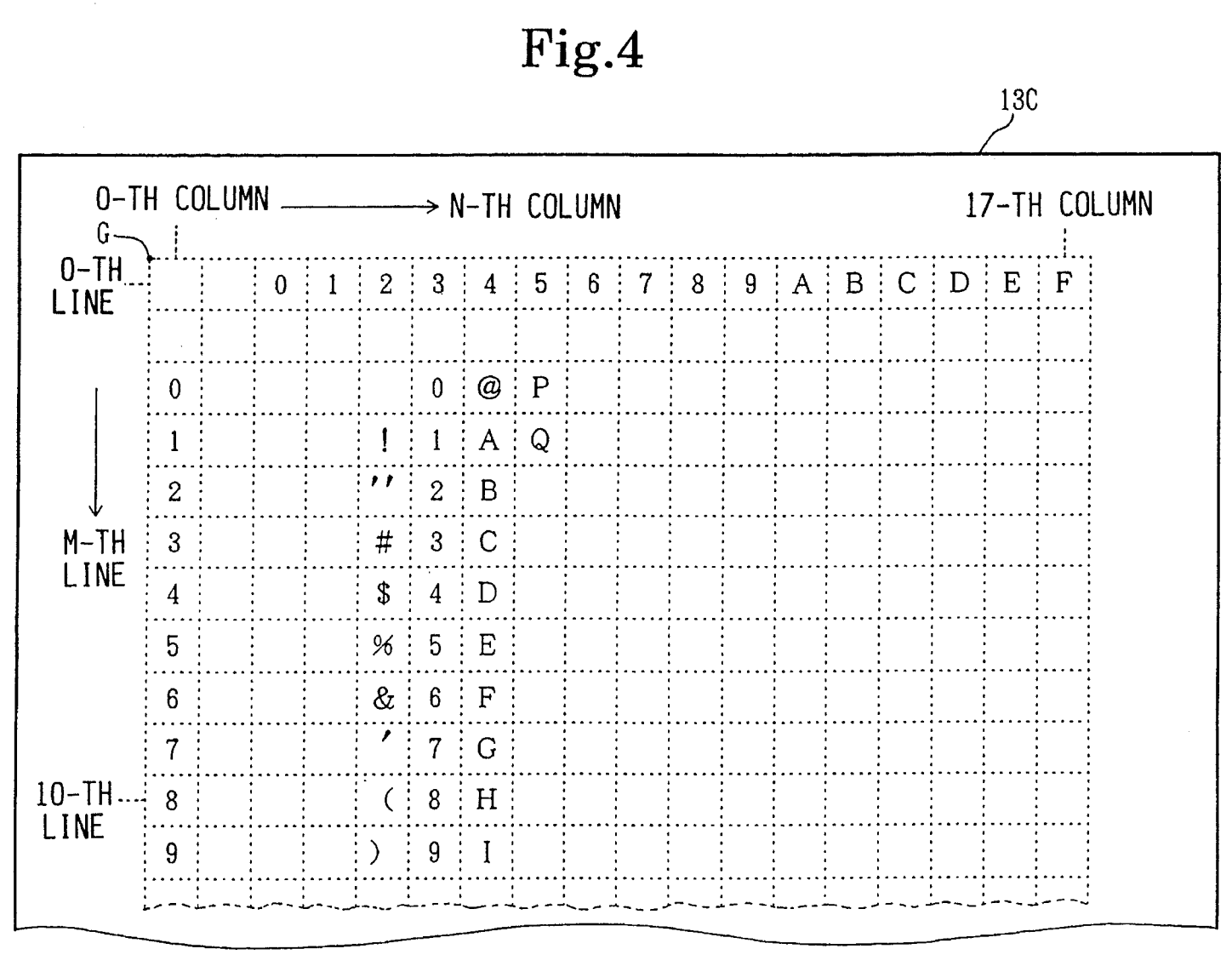

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | | | | | | | | | | | | | | | | |
| 1 | | | | 0 | @ | P | | | | | | | | | | |
| 2 | | | ! | 1 | A | Q | | | | | | | | | | |
| 3 | | | " | 2 | B | | | | | | | | | | | |
| 4 | | | # | 3 | C | | | | | | | | | | | |
| 5 | | | $ | 4 | D | | | | | | | | | | | |
| 6 | | | % | 5 | E | | | | | | | | | | | |
| 7 | | | & | 6 | F | | | | | | | | | | | |
| 8 | | | ' | 7 | G | | | | | | | | | | | |
| 9 | | | ( | 8 | H | | | | | | | | | | | |
| | | | ) | 9 | I | | | | | | | | | | | |

0-TH COLUMN → N-TH COLUMN → 17-TH COLUMN

0-TH LINE, M-TH LINE, 10-TH LINE

PRINT DEVICE FOR PRINTING CODE DATA IN ASSOCIATION WITH CODE NUMBERS

BACKGROUND OF THE INVENTION

1. Field of the Invention

The invention relates to a print device for printing code data including characters and symbols in association with (in correspondence to) code numbers of the code data.

2. Description of Related Art

The development of office automation has recently promoted the introduction of personal computers or work stations into enterprises. The personal computers are connected to a printer such as a laser printer or a dot printer which can perform a printing operation at high speed, and also connected to one another through cables to form a network system. Each of the computers transmits a desired document data or image data stored in a memory thereof to the laser printer or dot printer. The laser printer or the dot printer prints the desired document data or image data.

In general, in order to receive and print various kinds of document data of different code systems, the printer has beforehand stored therein plural (for example, 20) code tables corresponding to the plural kinds of code systems in a control device thereof. For reception of a document data, an operator manipulates a selection key on an operation panel of the printer to selectively set a code table which is suitable for the code system of the document data to be received. Through this manipulation, the printer carries out an accurate printing operation of the characters and symbols of the document data.

As described above, when the operator selectively sets a desired one of the plural kinds of code tables to print a desired document data, there may occur a case where the operator knows the name of the code table to be used, however, does not accurately recognize the characters and symbols which can be printed on the basis of the selected code table. In this case, the operator must refer to a manual each time to confirm the characters and symbols which can be printed using the code table. In some cases, the manual is not near to the operator and thus the operator cannot find it immediately. Accordingly, it takes a long time for the operator to refer to the manual and thus a print working efficiency is extremely reduced.

SUMMARY OF THE INVENTION

An object of the invention is to provide a print device for printing code data including characters and symbols in association with code numbers of the code data, thereby improving the working efficiency.

The print device according to the invention includes printing means for printing characters and symbols on a print medium, code table storing means for storing code tables in which code numbers and code data for characters and symbols are arranged in association with each other, code table selecting means for selecting a code table stored in the code table storing means, editing means for editing code data of characters and symbols in a code table selected in the code table selecting means in association with the corresponding code number, and control means for controlling the printing means to carry out a printing operation so that the characters and symbols indicated by the code data which are edited in the editing means are in association with (correspond to) the code numbers thereof.

According to the print device of the invention, one of the code tables stored in the storing means is selected by the code table selecting means, and the editing means edits the code data of the characters and symbols in the code table which is selected in the code table selecting means, in association with the code numbers thereof. For the code data of the characters and symbols edited in the editing means and the code numbers, the control means controls the printing means to carry out the printing operation so that the characters and symbols indicated by the code data of the edited characters and symbols correspond to the code numbers.

For the code data of the characters and symbols of the selected code table, the characters and symbols indicated by the code data are printed in association with the code numbers thereof, so that the operator can easily confirm, in association with the code numbers, the characters and symbols which can be printed using the selected code table.

BRIEF DESCRIPTION OF THE DRAWINGS

A preferred embodiment of the invention will be described in detail With reference to the following figures wherein:

FIG. 2 is a diagram showing the contents of plural code tables stored in a code table memory;

FIG. 4 is a diagram showing characters and symbols serving as a code data stored at a predetermined position in an edition table memory and code numbers thereof; and FIG. 5 is a diagram showing a print example of characters and symbols serving as a code data in the code table, which are printed on a print sheet.

DETAILED DESCRIPTION OF THE PREFERRED EMBODIMENTS

A preferred embodiment according to the invention will be hereunder described with reference to the accompanying drawings.

This embodiment relates to a case where the invention is applied, for purposes of explanation, to a laser printer LP for receiving and printing document data or image data which is transmitted from a personal computer.

Figure 1:
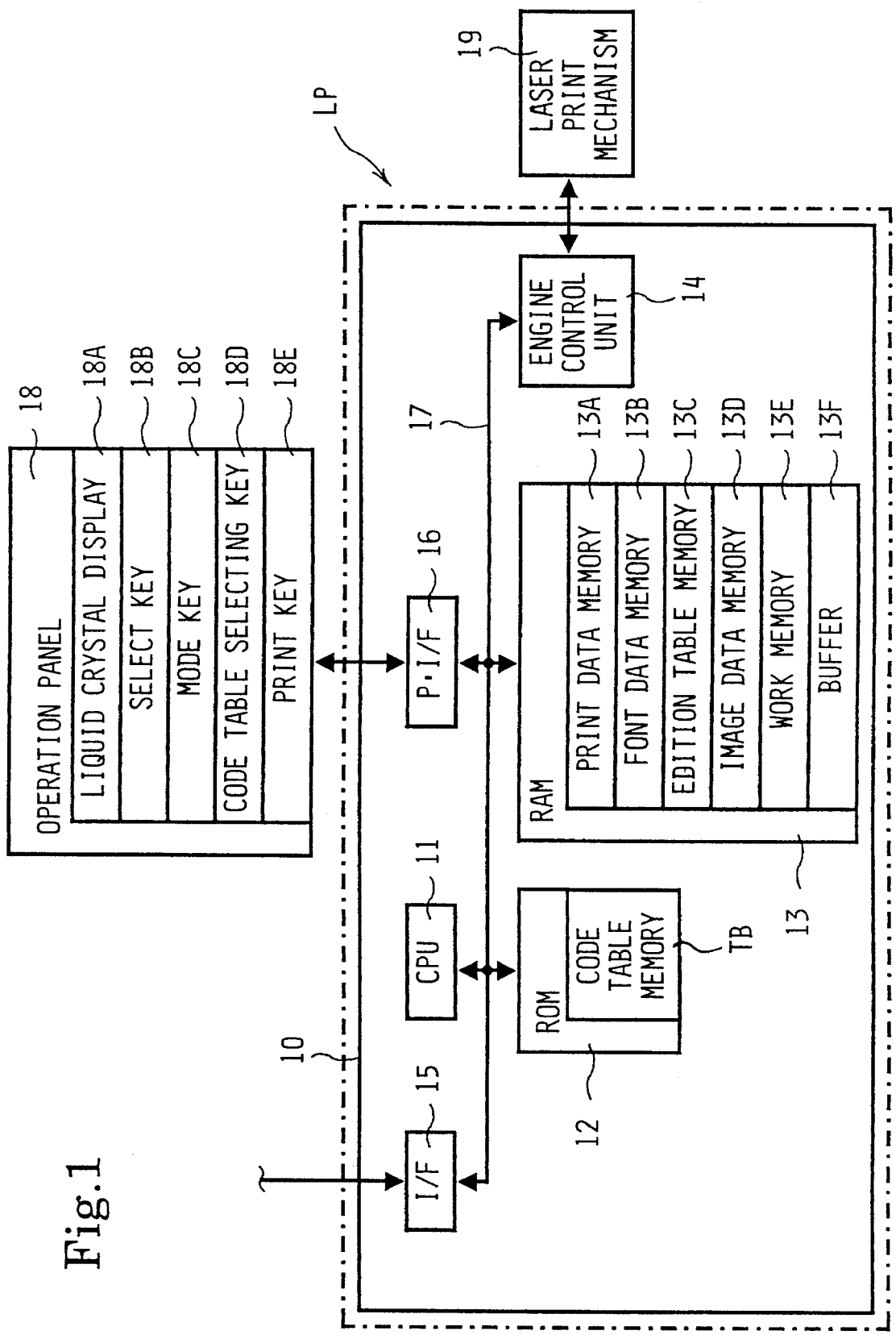
FIG. 1 is a block diagram showing a control system for a laser printer.

The control system for the laser printer LP will be described with reference to a block diagram of FIG. 1. The control system is basically similar to that of a general laser printer, and thus it will be briefly described.

A control unit 10 for the laser printer LP comprises a CPU 11, a ROM 12 connected to the CPU 11 through a data bus 17, a RAM 13 and an engine control unit 14. Serial or parallel print data which is received from a personal computer through a data receiving interface (I/F) 15 is supplied to the bus 17. The bus 17 is connected to a panel interface (P.I/F) 16 for receiving signals from an operation panel 18.

The operation panel 18 is provided with a liquid crystal display 18A on which plural characters, such as Katakana, numerals, and symbols, can be simultaneously displayed, a select key 18B for alternately switching on-line and off-line to each other, a mode key 18C for selectively setting plural kinds of operation modes provided to the laser printer LP and altering set contents, a code table selection key 18D for selectively setting a code table which is optimum to character code conversion of a received document data, and a print key 18E for printing the contents of the selected code table.

The engine control unit 14 comprises a microcomputer equipped with a CPU, a ROM and a RAM, and outputs a driving signal to a laser print mechanism 19.

The ROM 12 stores therein a selected code table printing control program which is inherent to this invention as described later and various other control programs therein, and outline data (outline font data) for defining the outline of each of many characters, such as letters and symbols. The ROM 12 has a code table memory TB. The code table memory TB beforehand stores plural kinds of code tables each of which is used to convert each of one group of code data of characters and symbols to a corresponding outline data.

As shown in FIG. 2, for example, twenty kinds of code tables are successively stored in the code table memory TB. In the first code table "Roman 8", code numbers "00(HEX)" to "FF(HEX)" are successively stored from the top address Aa in association with their corresponding code data. Subsequent to the code table "Roman 8", "IBM850", . . . are successively stored in the code table memory TB.

The RAM 13 includes a print data memory 13A for storing print data (of the received data) to be processed and fixed form data, a font data memory for storing common font data which are used to print letters, symbols and marks transmitted from the personal computer, an edition table memory 13C (see FIG. 4) for storing an edition table in which code data such as letters and symbols and code numbers are arranged in association with each other, an image data memory 13D for developing one-page print data to dot pattern data and storing the developed dot pattern data, a work memory 13E, and a buffer 13F for temporarily storing a calculation result of the CPU 11.

Figure 3:
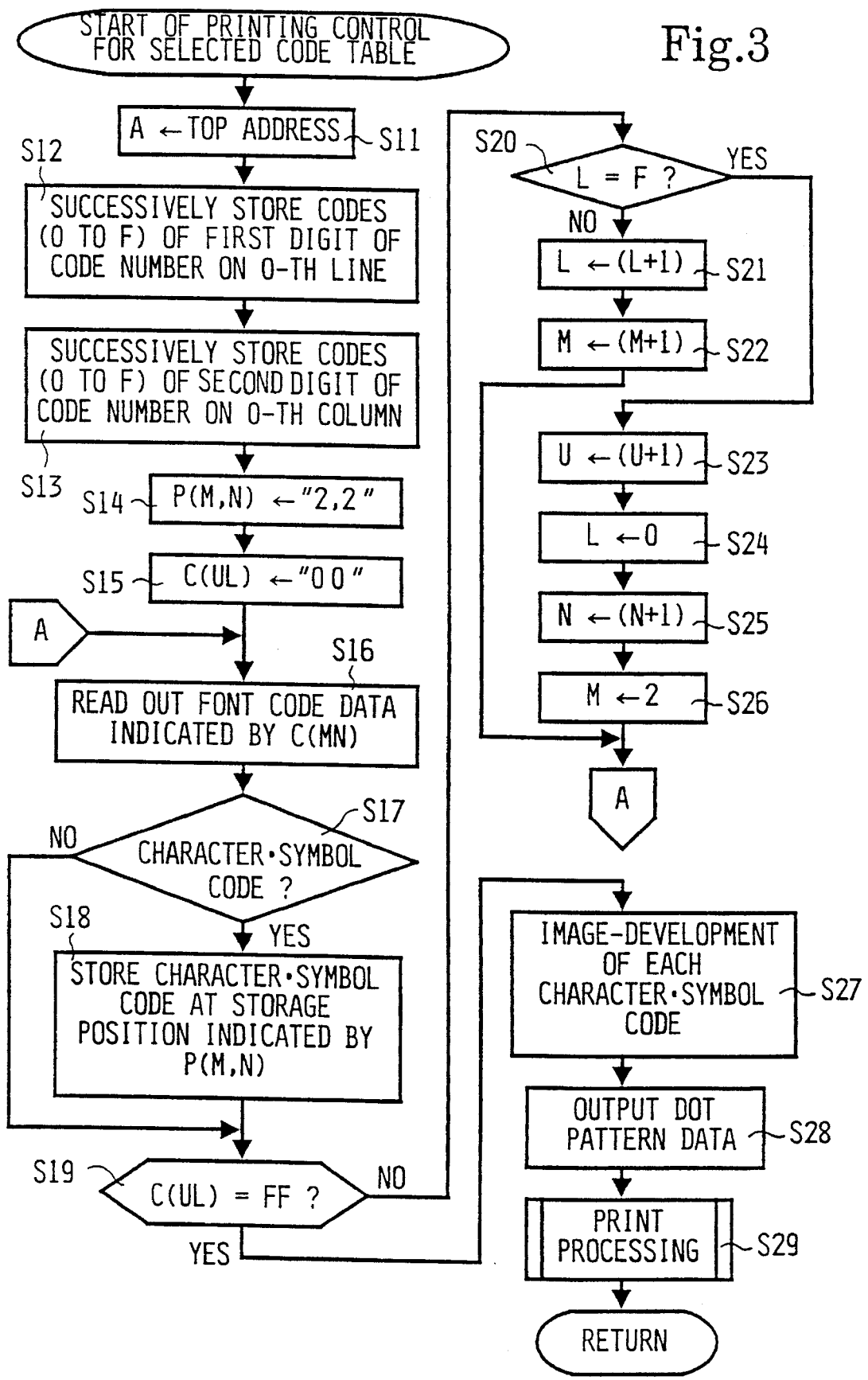
FIG. 3 is a flowchart for a routine of a print control for a selected code table.

Next, the routine for the selected code table printing control which is carried out in the control unit 10 will be described with reference to a flowchart of FIG. 3. In FIG. 3, a reference character Si (i= 11, 12, 13, . . . ) represents each step.

Prior to reception of a document data, the operator manipulates the code table selection key 18D to select a desired "code table" from plural code tables while checking the code tables through the display of the liquid crystal display 18A. Upon manipulation of the print key by the operator, the selected code table printing control is started, and the following processing is carried out.

First, the top address of the code table memory TB (FIG. 2) which corresponds to the currently-set "code table" is stored into an address counter A (S11). Each of 16 codes (0 to F) at the first digit of the code number for the "code table" is successively stored on a 0-th line commencing at the third (designated as column number 2) and subsequent columns (along an x axis) in the edition table memory 13C as shown in FIG. 4 (S12). Likewise, each of 16 codes (0 to F) at the second digit of the code number is successively stored on a 0-th column commencing at the third (designated as line number 2) and subsequent lines (along a y-axis) in the edition table memory 13C (S13). In FIG. 4, a reference character G represents a predetermined original position which is used to set a matrix of storage positions comprising plural lines and columns in the edition table memory 13C.

A storage position "2,2" is subsequently set to a count value (M, N) of a storage position counter P for indicating each of the matrix-formed storage positions with a coordinate value (S14). An initial count value "00" is set as a count value (UL) of a code number counter C for indicating each code number of the selected code table (S15). "U" of the code number counter C represents any one of 16 codes (0 to F) at the first digit of the code number, and "L" of the code number counter C represents any one of 16 codes (0 to F) of the second digit of the code number.

A code data indicated by the code number counter C is read out (S16), and if a character.symbol code is detected (S17: YES), the character.symbol code is stored at a storage position of the edition table memory 13C, which is indicated by the storage position counter P (S18). If the code data indicated by the code number counter C is a control code and no character.symbol code is detected (S17: NO), the control processing goes to a step S19.

If the count value (UL) of the code number counter C is not the final value "FF" (S19: NO) and the second-digit code "L" is not the final code "F" (S20: NO), the second-digit code "L" is incremented by "1" (S21), and a line number M of the count value (M, N) of the storage position counter P is incremented by "1" (S22), thereafter executing the control processing at the step S16 and subsequent steps.

If the second-digit code "L" becomes "F" (S20: YES), the first-digit code "U" of the count value (UL) of the code number counter C is incremented by "1" (S23), and "0" is set to the second-digit code "L" (S24). A column number "N" of the count value (M<N) of the storage position counter P is incremented by "1" (S25), and "2" is set to the line number "M" (S26), thereafter executing the control processing at the step S16 and subsequent steps.

When all character.symbol codes contained in the code numbers "00" to "FF" of the "code table" are stored at predetermined storage positions of the edition table memory 13C (S19: YES), the print data is subjected to an image development to be developed and stored as dot pattern data in an image data memory in the state where the character.symbol codes and the code numbers are arranged in association with each other (S27). A driving signal which is based on the dot pattern data of the image data memory is output from the engine control unit 14 to the laser print mechanism 19 (S28), and printed on the print sheet P by the laser print mechanism (S29). Thereafter, the control processing is terminated, and the processing returns to the main routine.

Figure 5:
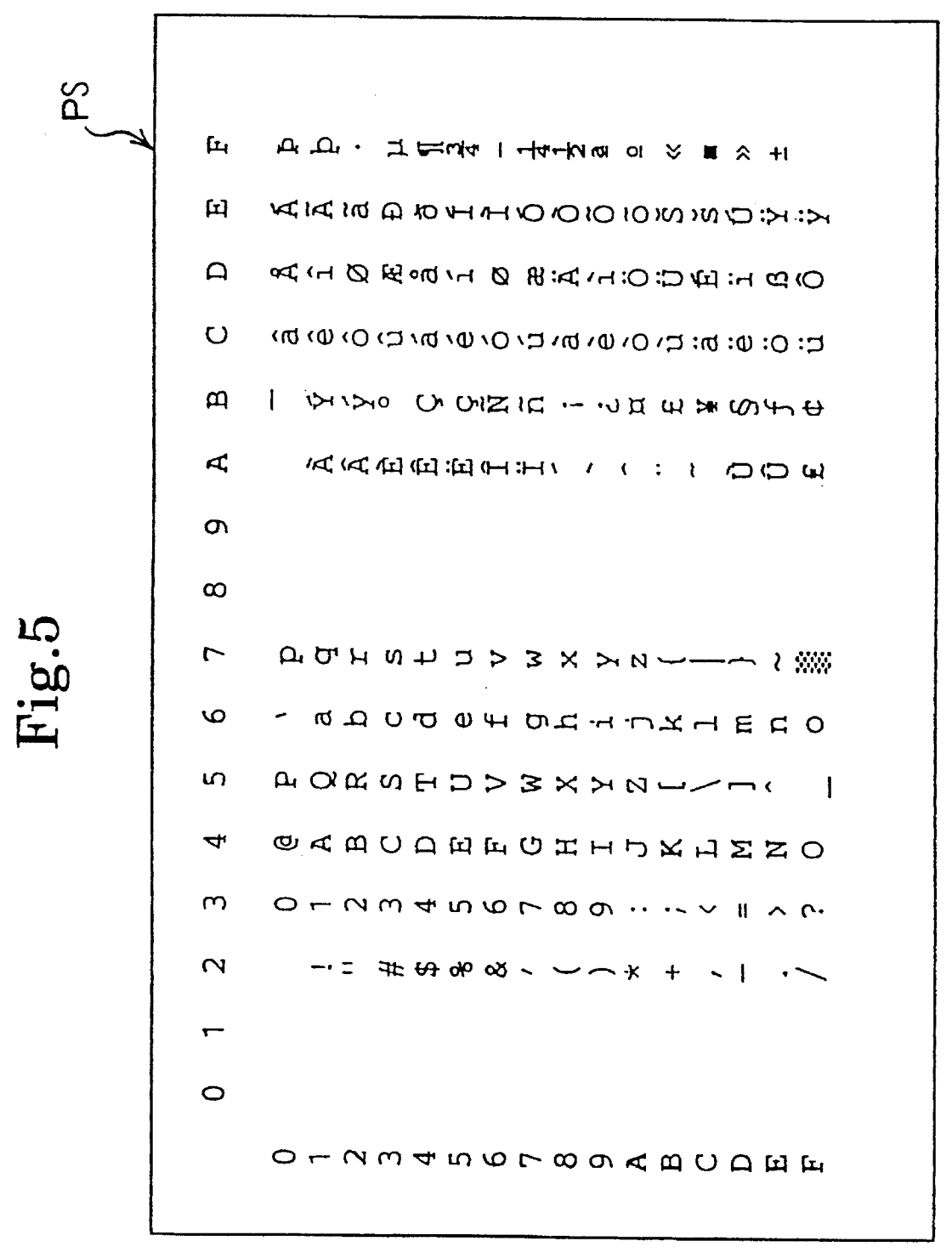

For example, when the code table "Roman 8" is selectively set, as shown in FIG. 4, one group of character.symbol codes are stored at predetermined storage positions of the edition table memory 13C in accordance with the first-digit codes "0" to "F" and the second-digit codes "0" to "F" of the code numbers "00" to "FF". Subsequently, as shown in FIG. 5, one group of characters and symbols are printed in a matrix form on the print sheet PS in association with the first-digit codes "0" to "F" and the second-digit codes "0" to "F".

As described above, all character symbol codes of a selected code table from plural code tables are printed in a matrix form on the print sheet in association with the code numbers thereof, so that the operator can easily confirm the characters and symbols, which can be printed using the selected code table, in association with the code numbers thereof.

Further, all characters and symbols of the code table are printed on the basis of an instruction from the print key provided on the operation panel 18, and thus the operator can easily instruct the printing operation to the laser printer LP.

The invention is not limited to the above embodiment, and it may be applied to various kinds of print devices in which plural code tables are stored, such as a wire-dot print type of printer and an ink jetting type of printer.

What is claimed is

1. A print device, comprising:

printing means for printing characters and symbols on a print medium;

code table storing means for storing a plurality of code tables in which code numbers and code data for characters and symbols are arranged in association with each other for each code table;

code table selecting means for selecting a code table stored in said code table storing means;

arranging means for arranging code data of characters and symbols in the code table selected using said code table selecting means in association with the corresponding code number; and control means for controlling said printing means to carry out a printing operation so that the characters and symbols indicated by the code data which are arranged by said arranging means are printed in association with the code numbers, wherein the code number for code data of the characters and symbols includes a first-digit code and a second-digit code and the characters and symbols are printed in a matrix form in association with the code number including the first-digit code and the second-digit code.

2. The print device as claimed in claim 1, wherein the code number is hexadecimal code consisting of the first-digit code and the second-digit code.

3. A print device, comprising:

printing means for printing characters and symbols on a print medium;

code table storing means for storing plurality of code tables containing code data of characters and symbols;

font data storing means for storing font data of characters and symbols;

code table selecting means for selecting a code table from the plurality of code tables stored in said code table storing means;

print instruction outputting means for outputting an instruction for printing characters and symbols of a code table selected in said code table selecting means;

code number generating means for generating code numbers, each of the code numbers comprising a first-digit code and a second-digit code in association with code data of characters and symbols;

arranging means for arranging the code data of all characters and symbols of the code table selected by said code table selecting means in association with the code numbers generated in said code number generating means; and control means for reading out from said font data storing means font data corresponding to the code data of the characters and symbols edited in said editing means and the code numbers on the basis of the output of said print instruction outputting means, and controlling said printing means to carry out a printing operation so that the characters and symbols are in association with the code numbers, wherein said arranging means comprises an edition table memory, and stores the code data of all characters and symbols in association with the code numbers in a matrix form in the edition table memory including the first-digit code and the second-digit code generated by said code number generating means and said control means controls said printing means so that the characters and symbols are printed in the matrix form as stored in the edition table memory in association with the code number including the first-digit code and the second-digit code.

4. The print device as claimed in claim 3, said arranging means arranges the code data of all characters and symbols in association with the code numbers such that the code data is stored at a position indicated by the first-digit code and the second-digit code.

5. The print device as claimed in claim 3, said code table selecting means includes a code table selection key and a liquid crystal display.

6. The print device as claimed in claim 3, wherein the code number is hexadecimal code.

7. A print device, comprising:

printing means for printing characters and symbols on a print medium;

code table storing means for storing plural code tables containing code data of characters and symbols;

font data storing means for storing font data of characters and symbols;

code table selecting means for selecting a code table stored in said code table storing means;

print instruction outputting means for outputting an instruction for printing characters and symbols of a code table selected in said code table selecting means;

code number generating means for generating code numbers, each of the code numbers comprising a first-digit code and a second-digit code in association with code data of characters and symbols;

an edition table memory for storing the code data of all characters and symbols of the code table selected in said code table selecting means at a position in a matrix form indicated by the first-digit code and the second-digit code generated in said code number generating means; and control means for reading out from said font data storing means font data corresponding to the code data of the characters and symbols and the code numbers stored in the edition table memory on the basis of the output of said print instruction outputting means, and controlling said printing means to carry out a printing operation so that the characters and symbols are printed in the matrix form indicated by the first-digit code and the second-digit code.

8. The print device as claimed in claim 7, said code table selecting means includes a code table selection key and a liquid crystal display.

9. The print device as claimed in claim 7, wherein the code number is hexadecimal code.

10. The print device as claimed in claim 1, further comprising a display device for displaying the plurality of code tables for selection of the code table by the code table selecting means.

11. The print device as claimed in claim 2, wherein the first-digit code defines a column and the second-digit code defines a row in the matrix form.

12. The print device as claimed in claim 4, wherein the first-digit code defines a column and the second-digit code defines a row in the matrix form.

13. The print device as claimed in claim 7, wherein the first-digit code defines a column and the second-digit code defines a row in the matrix form.

* * * * *